(12) United States Patent
Steinhauer et al.

(10) Patent No.: US 10,018,715 B2
(45) Date of Patent: Jul. 10, 2018

(54) RADAR SENSOR FOR MOTOR VEHICLES

(71) Applicant: Robert Bosch GmbH, Stuttgart (DE)

(72) Inventors: Matthias Steinhauer, Steinheim (DE); Raphael Hellinger, Farmington Hills, MI (US)

(73) Assignee: ROBERT BOSCH GMBH, Stuttgart (DE)

( * ) Notice: Subject to any disclaimer, the term of this patent is extended or adjusted under 35 U.S.C. 154(b) by 371 days.

(21) Appl. No.: 14/914,835

(22) PCT Filed: Jun. 24, 2014

(86) PCT No.: PCT/EP2014/063208
§ 371 (c)(1),
(2) Date: Feb. 26, 2016

(87) PCT Pub. No.: WO2015/028167
PCT Pub. Date: Mar. 5, 2015

(65) Prior Publication Data
US 2016/0209504 A1    Jul. 21, 2016

(30) Foreign Application Priority Data

Aug. 27, 2013 (DE) ........................ 10 2013 216 970

(51) Int. Cl.
*G01S 13/42* (2006.01)
*G01S 3/20* (2006.01)
(Continued)

(52) U.S. Cl.
CPC .............. *G01S 13/426* (2013.01); *G01S 3/20* (2013.01); *G01S 3/44* (2013.01); *G01S 7/35* (2013.01);
(Continued)

(58) Field of Classification Search
CPC ........ G01S 13/34; G01S 13/42; G01S 13/426; G01S 13/4445; G01S 13/4454;
(Continued)

(56) References Cited

U.S. PATENT DOCUMENTS

2006/0250296 A1    11/2006  Focke et al.
2008/0291087 A1*   11/2008  Tietjen ............... G01S 7/03
                                                342/372
2013/0288728 A1*   10/2013  Davydov ............ H04B 7/024
                                                455/502

FOREIGN PATENT DOCUMENTS

CN         1808177 A      7/2006
CN       101490578 A      7/2009
(Continued)

OTHER PUBLICATIONS

"ACC Adaptive Cruise Control", Publ. by Robert Bosch GmbH (2003), pp. 1-80.

*Primary Examiner* — Timothy A Brainard
(74) *Attorney, Agent, or Firm* — Norton Rose Fulbright US LLP; Gerard Messina

(57) ABSTRACT

A radar sensor for vehicles, including a group antenna, having a linear array of antenna elements, a feed unit for feeding transmission signals having a settable phase relationship into the antenna elements, a control unit controlling the feed unit, and an evaluation device evaluating received radar echoes and angle-resolving locating of objects. The group antenna includes at least two non-interleaved subgroups, the feed unit supplies in-phase transmission signals to the elements, while the transmission signals for the various subgroups have a settable phase difference, the control unit periodically changes the settable phase difference so that the transmission signals have a base phase difference in one measuring cycle and a phase difference in another measuring cycle which differs by a fixed absolute (Continued)

value from the base difference. The control unit sets the base difference based on levels of the received radar echoes to maximize the level difference between the measuring cycles.

8 Claims, 4 Drawing Sheets

(51) Int. Cl.
    *G01S 3/44*     (2006.01)
    *G01S 13/93*     (2006.01)
    *G01S 7/35*     (2006.01)
    *G01S 13/44*     (2006.01)
    *G01S 13/34*     (2006.01)

(52) U.S. Cl.
    CPC ............ G01S 13/42 (2013.01); G01S 13/931 (2013.01); *G01S 13/34* (2013.01); *G01S 13/4445* (2013.01); *G01S 13/4454* (2013.01); *G01S 13/4463* (2013.01)

(58) Field of Classification Search
    CPC ...... G01S 13/4463; G01S 13/931; G01S 3/20; G01S 3/44; G01S 7/35
    USPC .......................................................... 342/81
    See application file for complete search history.

(56) References Cited

FOREIGN PATENT DOCUMENTS

| | | |
|---|---|---|
| DE | 102 56 524 | 7/2004 |
| DE | 10 2005 049772 | 4/2007 |
| JP | S62242876 A | 10/1987 |
| JP | H0611517 A | 1/1994 |
| JP | 2008294540 A | 12/2008 |
| JP | 2010071865 A | 4/2010 |
| WO | WO 2012/089385 | 7/2012 |

\* cited by examiner

# RADAR SENSOR FOR MOTOR VEHICLES

FIELD OF THE INVENTION

The present invention relates to a radar sensor for motor vehicles.

BACKGROUND INFORMATION

Radar sensors are used for detecting the traffic surroundings within the scope of driver assistance systems, for example, for radar-assisted distance control (ACC; adaptive cruise control). Such a driver assistance system is discussed, for example, in the publication "Adaptive Fahrgeschwindigkeitsregelung [Adaptive Cruise Control] ACC", Robert Bosch GmbH, Gelbe Reihe, 2002 edition, technical instruction. In addition to the distance and the relative velocity, the angle of the located objects is also an important measured variable of the radar sensor. In this case, both the horizontal angle (azimuth angle) and the vertical angle (elevation angle) are significant. The azimuth angle is used for estimating the lateral offset and therefore for lane assignment. The elevation angle enables, for example, a differentiation between objects which may be driven under or driven over, and objects which represent real obstructions. Thus, in particular in safety applications (PSS; predictive safety systems), erroneous triggering due to metallic objects such as manhole covers, tin cans, and the like may be avoided.

The azimuth angle resolution capability is usually achieved in that multiple angle-offset radar lobes are generated, in which the radar echoes are analyzed in separate channels. Scanning radar systems are also known, in which the radar lobe is pivoted. The pivoting of the transmitting and/or receiving lobe may be achieved, for example, with the aid of phased-array antennas. The directional characteristic of the antenna array results by superimposing the radiation diagrams of the individual antenna elements.

A radar sensor for motor vehicles is discussed in WO 2012 089 385 A1, using which the elevation angle of located objects may be at least roughly estimated. This radar sensor includes at least one group antenna, which is formed by a linear array of antenna elements, a feed unit for feeding transmission signals having an adjustable phase relationship into the antenna elements, a control unit for controlling the feed unit, and an evaluation device for evaluating received radar echoes and for angle-resolving locating of objects.

SUMMARY OF THE INVENTION

An object of the present invention is to provide an angle-resolving radar sensor having a simplified structure.

This object may be achieved in one specific embodiment of the present invention in that the group antenna is divided into at least two subgroups, which are not interleaved, the feed unit is configured to supply in-phase transmission signals to the antenna elements of each subgroup, while the transmission signals for the various subgroups have a settable phase difference, the control unit is configured to change the settable phase difference from measuring cycle to measuring cycle periodically in such a way that the transmission signals in one measuring cycle have a base phase difference and in another measuring cycle have a phase difference which differs by a fixed absolute value from the base phase difference, and the control unit is furthermore configured to set the base phase difference on the basis of the level of the received radar echoes to maximize the level difference between the measuring cycles.

The radar waves emitted from the two subgroups are superimposed to form a radar lobe, the main emission direction of which is a function of the particular phase difference. If the base phase difference is zero, in a first measuring cycle, all antenna elements of the entire group antenna are thus activated in-phase, and the main emission direction corresponds to the perpendicular to the plane of the group antenna. In the next measuring cycle, the phase difference is greater by a fixed absolute value, which is typically in the order of magnitude of 180°. At this phase difference of 180°, destructive interference is obtained on the perpendicular, so that the levels of the received radar echoes are minimal for objects which are located on the perpendicular. If the base phase difference is not equal to zero, in the first measuring cycle, the main emission direction thus deviates from the perpendicular, and the direction of destructive interference accordingly deviates from the perpendicular in the next measuring cycle. The radar lobes may therefore be pivoted within specific limits, by varying the base phase difference. If an individual object is located, there is thus a fixed and known relationship between the angle at which this object appears and the base phase difference, at which the level difference between the radar echo received in the first measuring cycle (with constructive interference) and the radar echo received in the next measuring cycle (with destructive interference) is maximal. By varying the base phase difference, the angle of the located object may therefore be determined or at least roughly estimated.

This approach has the advantage that in principle only a single phase shifter is required for setting the particular phase differences, while in contrast, for example, in conventional phased-array antennas, a separate phase shifter has to be provided for each individual antenna element.

The above-described approach may also be applied similarly to group antennas, which are used as receiving antennas or, in a monostatic antenna concept, as combined transmitting and receiving antennas. According to another specific embodiment, the present invention therefore also has a radar sensor for motor vehicles as the subject matter, including at least one group antenna, which is formed by a linear array of antenna elements, a superposition unit for superimposing received signals of the antenna elements having a settable phase relationship, a control unit for controlling the superposition unit, and an evaluation device for evaluating the received radar echoes and for angle-resolved location of objects, in which the group antenna is divided into at least two non-interleaved subgroups, the superposition unit is configured to superimpose the received signals of the antenna elements of each subgroup in phase, while the received signals of the various subgroups are superimposed with a settable phase difference, the control unit is configured to change the settable phase difference periodically from measuring cycle to measuring cycle in such a way that the received signals have a base phase difference in one measuring cycle and a phase difference in another measuring cycle which differs by a fixed absolute value from the base phase difference, and the control unit is furthermore configured to set the base phase difference on the basis of the level of the received radar echoes to maximize the level difference between the measuring cycles.

Advantageous embodiments of the present invention are specified in the further descriptions herein.

In one advantageous specific embodiment, the linear array of the antenna elements is a vertical column, so that an angle resolution capability in elevation is achieved. The setting of the base phase difference may also be used for the purpose of compensating for any possible alignment errors during the installation of the radar sensor in the vehicle. If the radar sensor were installed as a result of such an alignment error in such a way that, for example, the perpendicular to the plane of the group antenna corresponds to an elevation angle different from 0°, the base phase difference may thus be adapted in such a way that the radar lobe is pivoted just enough in the first measuring cycle that the main emission direction thereof corresponds to the elevation angle of 0°.

The radar sensor may include multiple group antennas in the form of multiple columns situated adjacent to one another, which are activated in phase, so that a more strongly directional effect is achieved in the azimuth.

One exemplary embodiment is explained in greater detail hereafter on the basis of the drawings.

DETAILED DESCRIPTION

Figure 1:
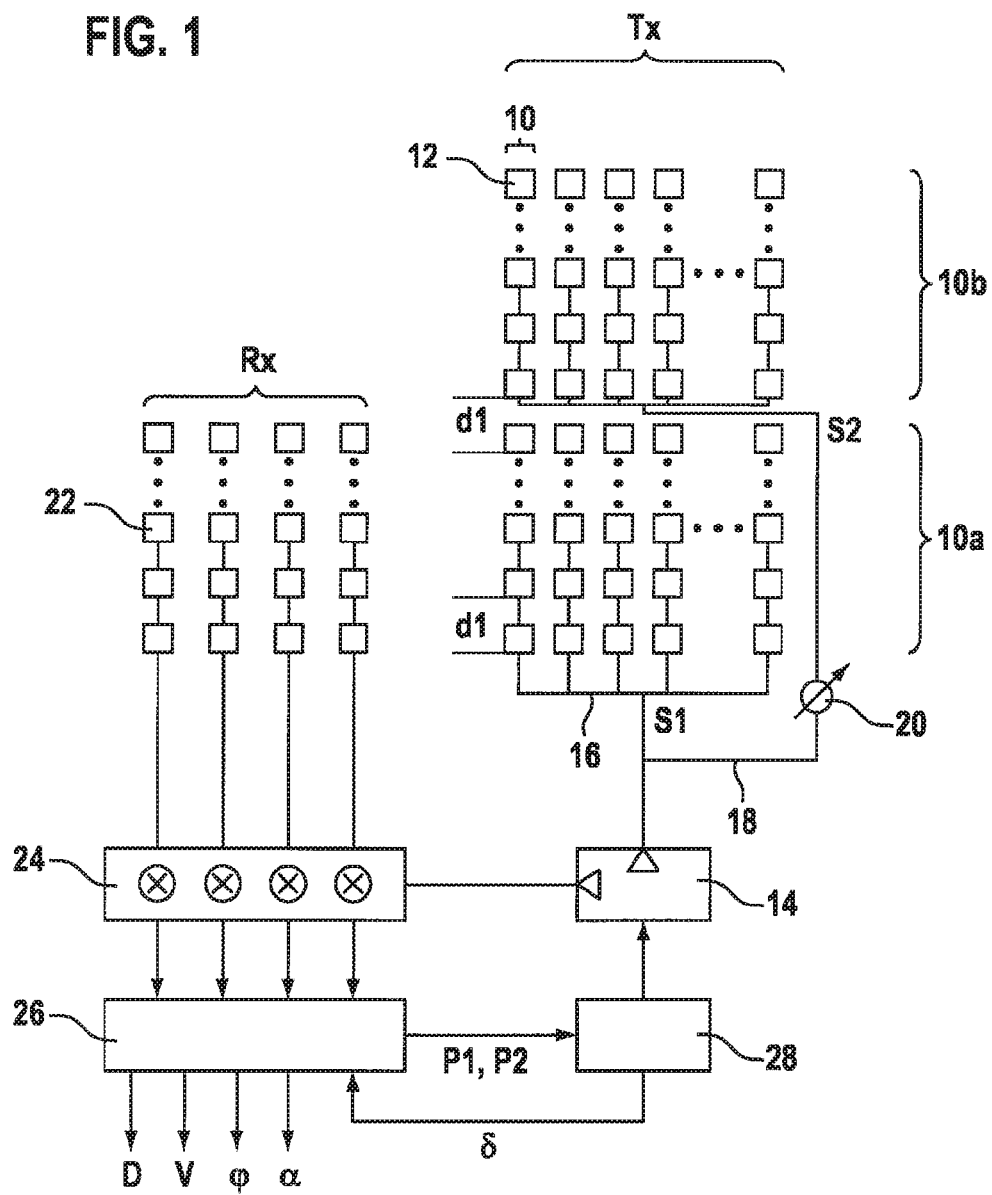
FIG. 1 shows a block diagram of a radar sensor according to the present invention.

The radar sensor shown in FIG. 1 includes an antenna array having a transmitting antenna array Tx and a receiving antenna array Rx. Transmitting antenna array Tx includes multiple group antennas 10, which are formed by vertical columns, which are situated adjacent to one another, of antenna elements 12. Each group antenna 10 is subdivided into two subgroups 10*a* and 10*b*. The subgroups are not interleaved, i.e., all antenna elements 12 associated with the same subgroup are directly adjacent to one another. In the example shown, each subgroup has the same number of antenna elements.

Antenna elements 12 are used to transmit a radar signal, which is generated by a local oscillator 14. The radar signal to be transmitted is distributed to subgroups 10*a* of each of group antennas 10 and then fed serially into individual antenna elements 12 within each subgroup via a first feed network 16. Correspondingly, the radar signal to be transmitted is distributed to subgroups 10*b* of each of group antennas 10 and then fed serially into individual antenna elements 12 within each subgroup via a second feed network 18.

The columns formed by group antennas 10 have uniform horizontal distances from one another. Feed network 16 is configured in such a way that all antenna elements 12 of subgroups 10*a* of all group antennas 10 are activated in phase, so that by superimposing the radiation emitted from the individual antenna elements, a bundling effect results both in the azimuth and also in the elevation. The main emission direction is perpendicular to the plane in which antenna elements 12 are situated, for example, on a shared high-frequency substrate. In order that individual antenna elements 12 of a subgroup are excited in phase, distance d1 between two adjacent antenna elements 12 within this subgroup corresponds to wavelength λ on the substrate (or is an integer multiple thereof). Antenna elements 12 of subgroups 10*b* also have equal distance d1, and the distance between the last antenna element of subgroup 10*a* and the first antenna element of subgroup 10*b* is also d1.

Feed network 18 is also configured in such a way that all antenna elements 12 of subgroups 10*b* of all group antennas 10 are activated in phase. However, it contains a phase shifter 20, using which a phase difference may be set between the transmission signals, which are supplied to subgroups 10*a*, on the one hand, and to subgroups 10*b*, on the other hand. If this phase difference is not equal to zero, a main emission direction, which deviates from the perpendicular to the plane of the substrate results for transmission antenna array Tx as a whole due to interference, and therefore a main emission direction having an elevation angle a which is not equal to zero, if the substrate is installed vertically in the vehicle.

When the radar signal, which is emitted from transmitting antenna array Tx, impinges upon an object, for example, a preceding vehicle, a part of the radar radiation is thus reflected, whereby it experiences a Doppler shift as a function of the relative velocity of the object, and the reflected signal is received by antenna elements 22 of receiving antenna array Rx. Antenna elements 22 are situated in four columns and are connected to one another in series within each column. Each column forms a receiving channel and is connected to an input of a four-channel mixer 24. The same signal, which is also transmitted to feed networks 16 and 18, is supplied from oscillator 14 to another input of this four-channel mixer 24. The signal received from each antenna column is mixed with the signal of local oscillator 14. Four-channel mixer 24 therefore supplies as mixed products four intermediate frequency signals Z1 through Z4, the frequency of which corresponds in each case to the frequency difference between the received signal and the signal of local oscillator 14.

Corresponding to the principle of an FMCW radar (frequency modulated continuous wave), the frequency of oscillator 14 is modulated in the form of a ramp (distance d1 between antenna elements 12 therefore corresponds, strictly speaking, to the mean wavelength on the substrate). The frequency of the radar echo received by antenna elements 22 therefore differs from the signal of the local oscillator by an absolute value which is dependent, on the one hand, on the signal runtime from the radar sensor to the object and back and, on the other hand, as a result of the Doppler effect, on the relative velocity of the object. Correspondingly, intermediate frequency signals Z1 through Z4 also contain information about the distance and the relative velocity of the object. During the frequency modulation, rising and falling frequency ramps alternate with one another, and by adding the intermediate frequency signals once to the rising ramp and once to the falling ramp and subtracting them once, the components which are dependent on the distance and velocity may be separated from one another, so that values are obtained for distance D and relative velocity V of each located object.

Intermediate frequency signals Z1 through Z4 are supplied to an evaluation device 26 and are recorded therein channel by channel, each over the duration of a frequency ramp, and fragmented into a spectrum by fast Fourier transform. In this spectrum, each object stands out due to a peak at the frequency determined by the particular object distance and the relative velocity.

The radar echoes received by the various columns of group Rx have a phase shift in relation to one another which is a function of particular azimuth angle φ of the object. As a result of the bundling of the signal transmitted from transmitting antenna array Tx, the amplitude of the received radar echo is also a function of the azimuth angle of the object. By comparing the amplitude and phase differences to a corresponding antenna diagram, azimuth angle φ may therefore also be determined in evaluation device 26.

An electronic control unit 28 controls oscillator 14 and phase shifter 20. In a first measuring cycle, which may include one or multiple frequency modulation ramps of oscillator 14, phase shifter 20 is set to a phase difference δ. The following relationship exists between transmission signal S1, which is supplied to subgroups 10*a*, and transmission signal S2, which is supplied to subgroups 10*b*:

$$S2=S1*\exp(i2\pi\delta)$$

As a result, the direction in which the signals emitted from subgroups 10*a*, on the one hand, and subgroups 10*b*, on the other hand, constructively interfere and form a main lobe deviates in elevation somewhat from elevation angle 0° (perpendicular to the substrate of the antenna array).

In a subsequent measuring cycle, which may again include one or multiple frequency modulation ramps of oscillator 14, phase shifter 20 is set to a phase difference δ+Δ. The following equation then applies:

$$S2=S1*\exp(i2\pi(\delta+\Delta))$$

Phase difference δ is the same as in the first measuring cycle and is referred to as the base phase difference. Additional phase difference Δ is 180° in an ideal antenna array. If base phase difference δ=0, subgroups 10*a* and 10*b* are thus activated in phase opposition, with the result that at an elevation angle of 0°, destructive interference occurs. If base phase difference δ is not equal to zero, the destructive interference occurs at an elevation angle which is not equal to zero.

In a real transmission antenna array Tx, specific hardware-related phase offsets may have the result that in the case of δ=0, the destructive interference does not occur exactly at the elevation angle of 0°, but rather at a somewhat different elevation angle. This may be compensated for in that a value is selected for Δ which deviates somewhat from 180°.

Figure 2:
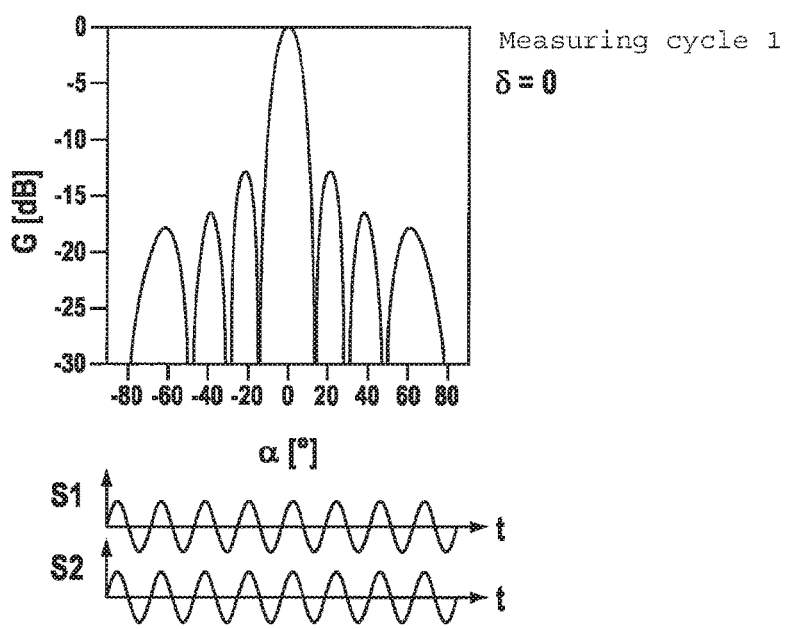
FIGS. 2, 3, 4, 5, 6, and 7 show diagrams to explain the operating mode of the radar sensor in the estimation of the elevation angle of an object.
Figure 7:
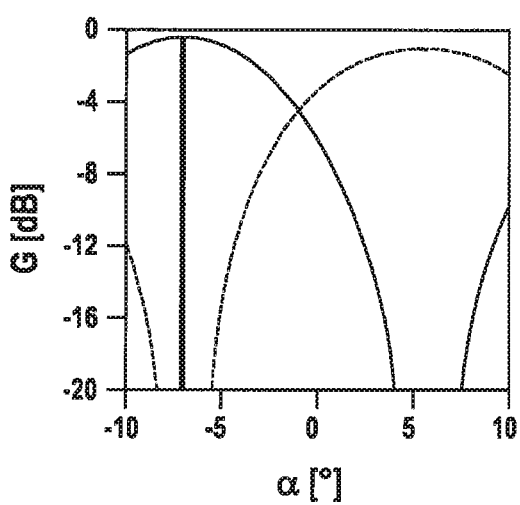

FIGS. 2 and 7 show antenna diagrams, in each of which gain G is plotted in dB (i.e., logarithmically) as a function of elevation angle α.

FIG. 2 shows an antenna diagram in elevation for the first measuring cycle with δ=0. Transmission signals S1 and S2 are in phase, and a main lobe having a width of approximately ±15° results due to constructive interference at elevation angle α=0°. The main lobe is flanked symmetrically by secondary lobes on both sides.

Figure 3:
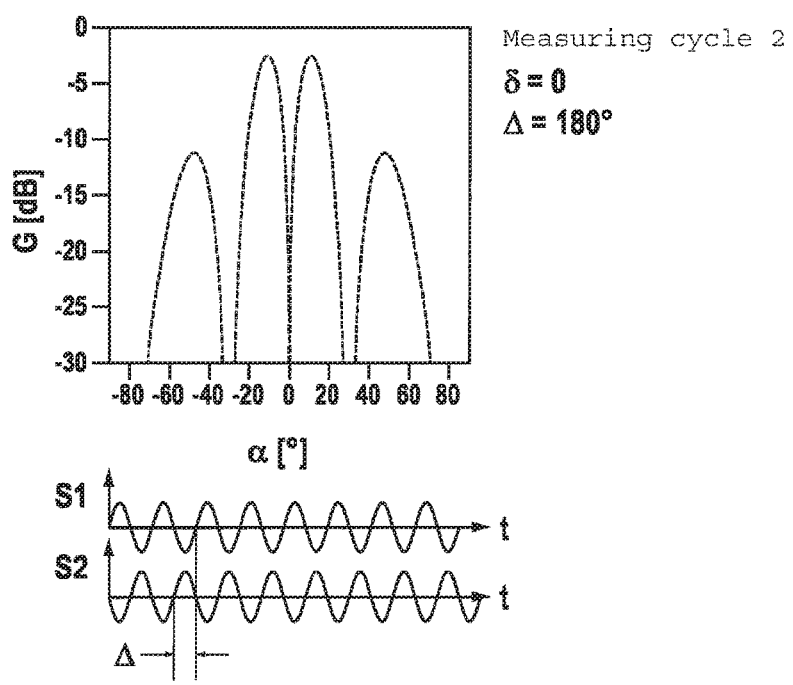

FIG. 3 shows the corresponding antenna diagram for the second measuring cycle with δ=0 and Δ=180°. Complete obliteration results here by way of interference at the elevation angle of 0°, and first-order maxima are symmetrical to the elevation angle of 0°.

If an object is located at the elevation angle of 0°, a clear radio echo will be obtained in this situation in the first measuring cycle, but in contrast practically no signal will be obtained in the second measuring cycle.

However, if the object is shifted somewhat toward positive or negative elevation angles, a somewhat weaker signal is obtained in the first measuring cycle, but a measurable signal is also obtained in the second measuring cycle. Overall, the system therefore reacts relatively sensitively to small changes of the elevation angle.

Figure 4:
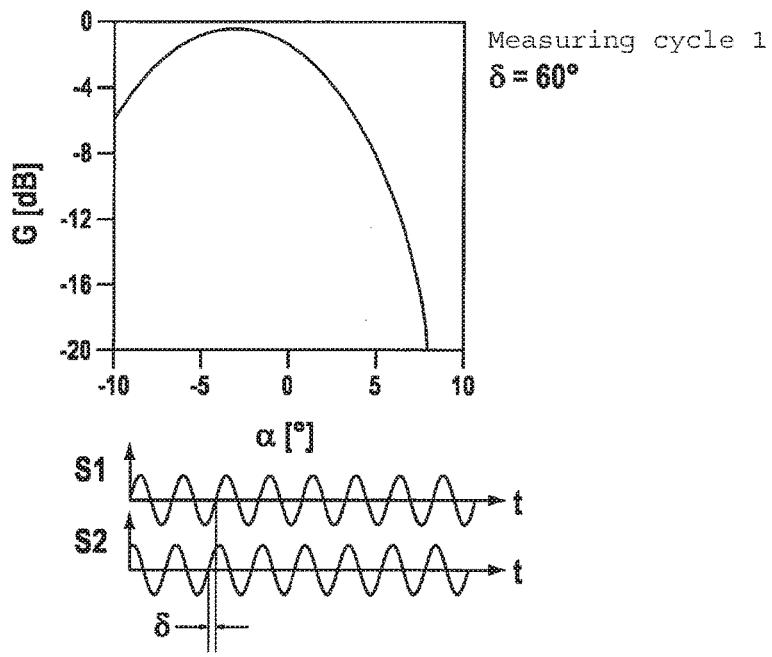
Figure 5:
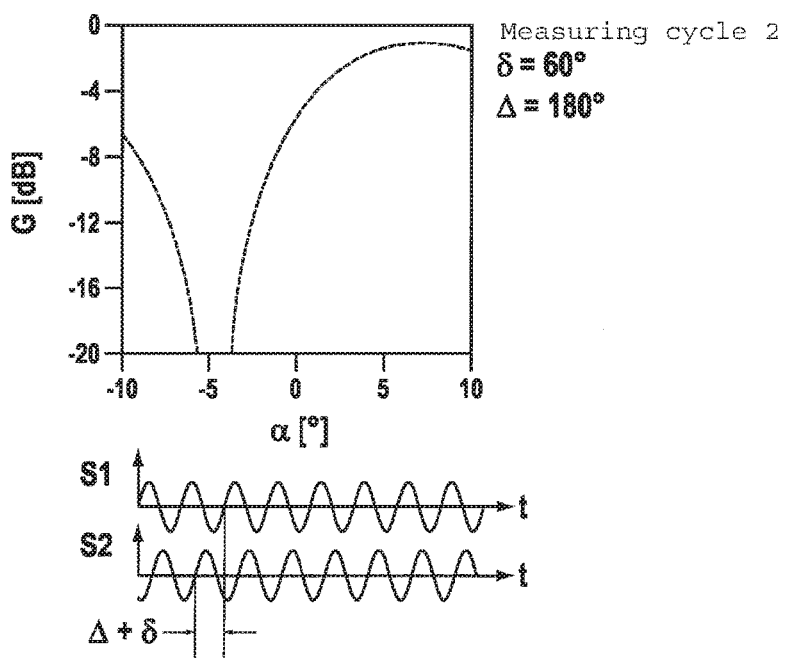

FIGS. 4 and 5 show the corresponding antenna diagrams for the first and the second measuring cycles for a phase difference δ=60°.

It is apparent in FIG. 4 that the main lobe is shifted toward negative elevation angles. Correspondingly, the location of maximum obliteration is shifted in FIG. 5 toward negative elevation angles.

Figure 6:
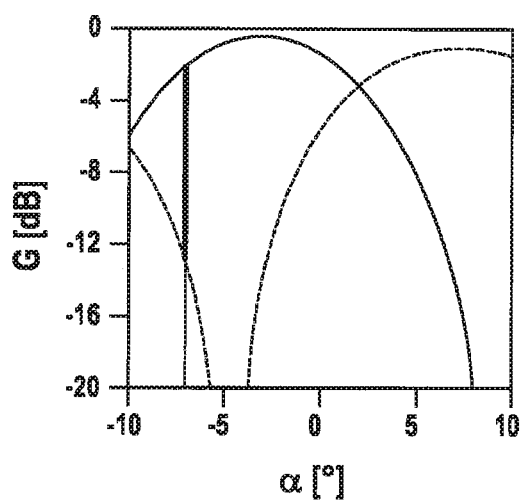

In FIG. 6, the antenna diagrams for the first and the second measuring cycles are combined to form a single diagram. A curve which is plotted by solid lines indicates the gain in the first measuring cycle and a curve which is plotted by a dashed line indicates the gain in the second measuring cycle. For an object which is located at an elevation angle of approximately −7°, the difference between the gains in the first and the second measuring cycles is shown by a bold bar. This difference represents the level difference, which is measured in the first and the second measuring cycles for the signal levels of this object (at the intermediate frequency defined by the distance and the relative velocity of this object).

As FIG. 1 shows, levels P1 and P2, which are measured for a located object in the first and the second measuring cycles, are reported by the evaluation device 26 to control unit 28. Control unit 28 thereupon varies base phase difference δ to maximize level difference P1−P2. The change of base phase difference δ results in a shift of the curves in the antenna diagram as shown in FIG. 7. As a result thereof, the difference between the gain increases and level difference P1−P2 increases accordingly, and it reaches a maximum at a specific base phase difference δ. This base phase difference δ is reported to evaluation device 26.

On the basis of the antenna diagrams, which may be measured beforehand for a given transmission antenna array Tx, a relationship may be established between base phase difference δ, at which the level difference is maximal, and associated elevation angle α. On the basis of this relationship, control unit 28 is capable of outputting a corresponding estimated value for elevation angle α.

If an alignment error has occurred during the installation of the radar sensor in the motor vehicle, which has the result that the substrate of the antenna array is not oriented precisely vertically, using the above-described array, an elevation angle not equal to 0° will be measured for objects, the reflection center of which is at an elevation angle of 0°, the deviation from 0° corresponding to the alignment error.

Since the case that the elevation angle of an object is at 0° will be statistically most frequent, the above-described measurement of elevation angle a may also be used to compensate for the alignment error. For example, control unit 28 may store phase difference δ, for which the level difference is maximal. If multiple objects are then located successively, a sliding mean value is calculated for associated base phase differences δ, with the consequence that the antenna lobe is gradually pivoted in elevation, until the alignment error is compensated for.

It is also possible when putting the radar sensor into operation, after the installation in the vehicle, to carry out a calibration measurement at the elevation angle of 0° and to store the base phase difference obtained in this case and use it as a starting value for all future measurements using the radar sensor.

In the above description, the present invention was explained on the basis of an example in which the measurement of elevation angle a is carried out with the aid of transmission antenna array Tx. Alternatively, of course, it is also possible to use reception antenna array Rx for this purpose. In this case, each column of antenna elements 22 of reception antenna array Rx would be subdivided into two subgroups, and phase shifter 20 would be connected between the particular second subgroup and four-channel mixer 24 in such a way that in each channel the signals received from the two subgroups are superimposed with the phase difference determined by phase shifter 20. Antenna diagrams which are similar to those of FIGS. 2 through 7 would then indicate the angle distribution of the sensitivity of reception antenna array Rx in elevation. The differences in the sensitivities again result in level differences which allow the determination of the elevation angle.

What is claimed is:

1. A radar sensor for a motor vehicle, comprising:
   at least one group antenna, which is formed by a linear array of antenna elements;
   a feed unit for feeding transmission signals having a settable phase relationship into the antenna elements;
   a control unit to control the feed unit; and
   an evaluation device to evaluate received radar echoes and for angle-resolving locating of objects;
   wherein the group antenna is divided into at least two subgroups, which are not interleaved, the feed unit is configured to supply in-phase transmission signals to the antenna elements of each subgroup, while the transmission signals for the various subgroups have a settable phase difference, the control unit is configured to periodically change a settable phase difference from measuring cycle to measuring cycle so that the transmission signals have a base phase difference in one measuring cycle and a phase difference in another measuring cycle which differs by a fixed absolute value from the base phase difference, and the control unit is configured to set the base phase difference based on the levels of the received radar echoes to maximize the level difference between the measuring cycles.

2. The radar sensor of claim 1, wherein the at least one group antenna is oriented vertically.

3. The radar sensor of claim 1, wherein the control unit is configured to store a standard value for the base phase difference, which compensates for an alignment error during the installation of the radar sensor in the motor vehicle.

4. The radar sensor of claim 3, wherein the control unit is configured to determine the stored standard value by statistical evaluation of the elevation angles measured for a plurality of objects.

5. A radar sensor for a motor vehicle, comprising:
   at least one group antenna, which is formed by a linear array of antenna elements;
   a superposition unit to superimpose received signals of the antenna elements with a settable phase relationship;
   a control unit to control the superposition unit; and
   an evaluation device to evaluate the received radar echoes and for angle-resolving locating of objects;
   wherein the group antenna is divided into at least two subgroups, which are not interleaved, the superposition unit is configured to superimpose the received signals of the antenna elements of each subgroup in phase, while the received signals of the various subgroups are superimposed with a settable phase difference, the control unit is configured to change the settable phase difference from measuring cycle to measuring cycle periodically so that the received signals have a base phase difference in one measuring cycle and a phase difference in another measuring cycle which differs from the base phase difference by a fixed absolute value, and the control unit is configured to set the base phase difference based on the levels of the received radar echoes to maximize the level difference between the measuring cycles.

6. The radar sensor of claim 5, wherein the at least one group antenna is oriented vertically.

7. The radar sensor of claim 5, wherein the control unit is configured to store a standard value for the base phase difference, which compensates for an alignment error during the installation of the radar sensor in the motor vehicle.

8. The radar sensor of claim 7, wherein the control unit is configured to determine the stored standard value by statistical evaluation of the elevation angles measured for a plurality of objects.

* * * * *